(12) United States Patent
Singh et al.

(10) Patent No.: US 9,235,858 B1
(45) Date of Patent: Jan. 12, 2016

(54) LOCAL SEARCH OF NETWORK CONTENT

(75) Inventors: Sachin B. Singh, Sammamish, WA (US); Martin C. Eitreim, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 718 days.

(21) Appl. No.: 13/557,886

(22) Filed: Jul. 25, 2012

(51) Int. Cl.
*G06Q 30/00* (2012.01)
*G06Q 30/06* (2012.01)

(52) U.S. Cl.
CPC ........ *G06Q 30/0623* (2013.01); *G06Q 30/0631* (2013.01); *G06Q 30/0641* (2013.01)

(58) Field of Classification Search
CPC ................ G06Q 30/06–30/0645; G06Q 30/08
USPC .................................................. 705/26.1–27.2
See application file for complete search history.

(56) References Cited

U.S. PATENT DOCUMENTS

| 2006/0129446 | A1* | 6/2006 | Ruhl ................. G06F 17/30873 705/306 |
| 2006/0224587 | A1* | 10/2006 | Zamir et al. ....................... 707/7 |
| 2008/0034329 | A1* | 2/2008 | Posner et al. ................. 715/856 |
| 2012/0221502 | A1* | 8/2012 | Jerram .................... G06Q 30/02 706/46 |
| 2013/0024282 | A1* | 1/2013 | Kansal et al. .............. 705/14.53 |
| 2014/0258049 | A1* | 9/2014 | Gonsalves et al. ........... 705/27.2 |

OTHER PUBLICATIONS

W.w. grainger, inc.; patent application titled "system and method for highlighting differences in items in a search result listing" under review. (2012). Politics & Government Week, , 8201. Retrieved from http://search.proquest.com/docview/1112872770?accountid=14753.*

Target brands, inc.; researchers submit patent application, "breadcrumb filtering", for approval. (2013). Politics & Government Week, , 9232. Retrieved from http://search.proquest.com/docview/1400751643?accountid=14753.*

* cited by examiner

*Primary Examiner* — Resha Desai
*Assistant Examiner* — Alex Wolcott
(74) *Attorney, Agent, or Firm* — Thomas | Horstemeyer, LLP

(57) ABSTRACT

Disclosed are various embodiments for locally searching a search string in network content. A user accesses network content through a client device and enters a search string through the client device. Once the local search is performed on the network content by a client application or a search application through a network, the result would be encoded and displayed for the user to view. Furthermore, a content modifying application modifies the content of one or more network contents or pages based on the stored local search data. The content modifying application may also make recommendations as to what information should be included in the network content.

20 Claims, 9 Drawing Sheets

LOCAL SEARCH OF NETWORK CONTENT

BACKGROUND

Users often look for particular information about an item when they view network content featuring the item. However, it can be difficult for the users to find the information especially when the information is provided in a context not easily detectable for the users who may skim through the content.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
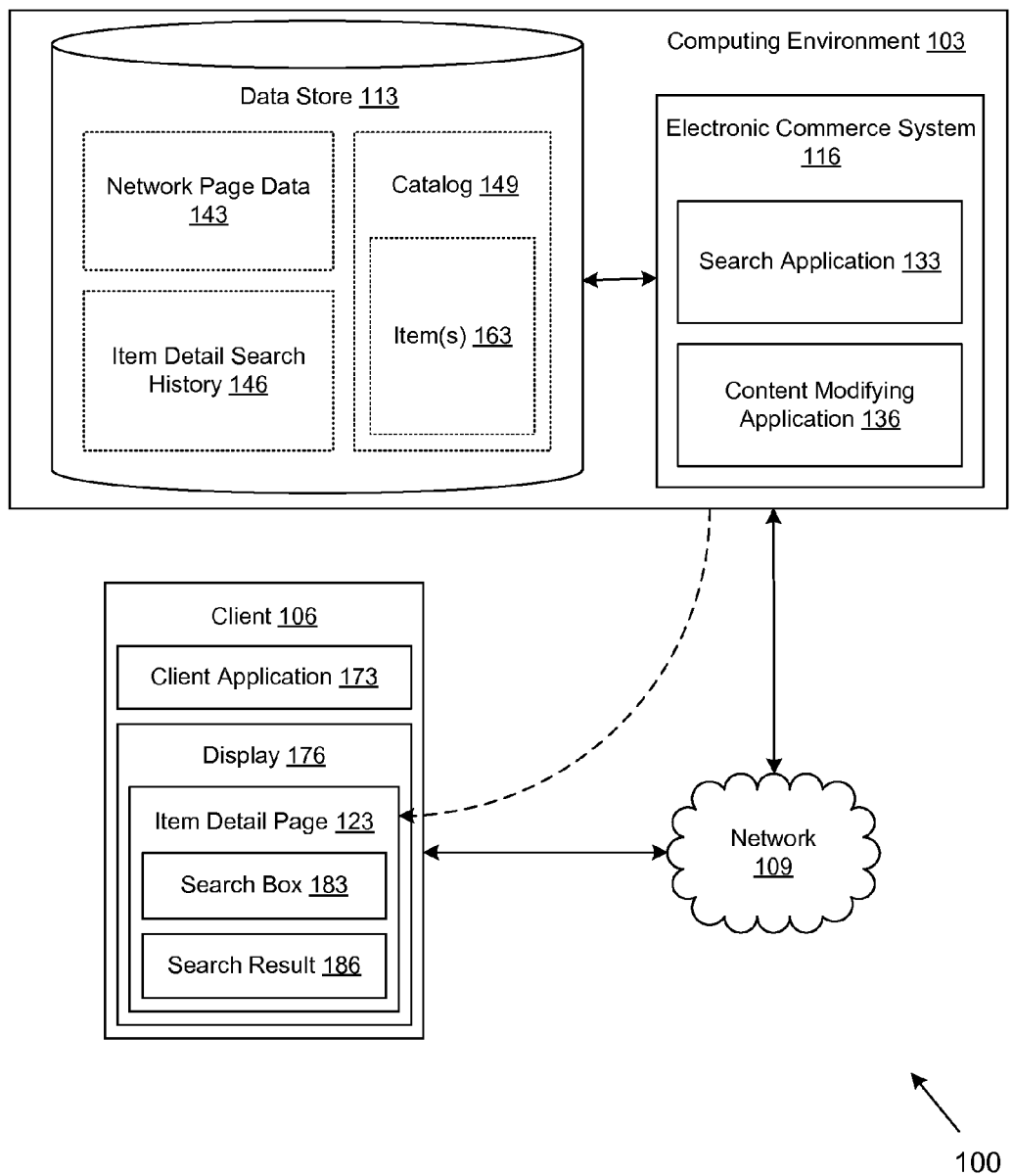
FIG. 1 is a drawing of a networked environment according to various embodiments of the present disclosure.

The present disclosure relates to a local search of network content where the information a user seeks may or may not be readily apparent to the user viewing the network content. For example, using a client device, Joe the user may visit a network page such as an item detail page, which features an item on sale. As Joe learns about the item on the item detail page, he may seek to learn about particular information, such as the technical specification, warranty information, or other information regarding the item. Often an item detail page contains multiple sections and paragraphs describing the item, and Joe may find it difficult to locate the information he is looking for about the item. According to various embodiments, a search capability is facilitated by the item detail page so that he may search within the item detail page instead of browsing through multiple sections and paragraphs in an effort to spot the pertinent information. Specifically, the item detail page may include a search text box into which Joe can enter a search string.

Once Joe enters the search string in the search box, either the server or his client device may perform a search of the item detail page based on the search string. The search also may be performed on the content linked or attached to the item detail page. After the search is performed, the result of the search may be displayed to Joe in various ways. For example, Joe can see the item detail page screen automatically scroll to the location where the search string is found. Also, text may be highlighted in the item detail page that matches his search string. He may also see a separate floating or peaking window that contains the result of the search and links for him to click for further information.

As multiple users like Joe visit the same item detail page, they may search for similar information about the item featured in the item detail page. The data regarding users' searches, such as when, where, by whom, and for what information the searches have been performed, may be stored in the item detail search history. Then, based on the item detail search history, certain information that users often search in the item detail page can be identified. Based on such identification, the item detail page can be modified by adding, removing, reordering, reorganizing, or otherwise changing the content in the item detail page. This is done so that next time Joe or any other user visits the item detail page, the content displayed in the item detail page, for example, may have been reordered to present more pertinent information in a more prominent manner. Furthermore, based on the item detail search history, the information regarding the item in other network pages or content can be modified. Also based on the item detail search history, the seller of the item or sellers of other similar items may receive recommendations as to what information to include in their item detail pages.

In the following discussion, a general description of the system and its components is provided, followed by a discussion of the operation of the same.

With reference to FIG. 1, shown is a networked environment 100 according to various embodiments. The networked environment 100 includes a computing environment 103 that is in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed in the computing environment 103 that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations.

Various applications and/or other functionality may be executed in the computing environment 103 according to various embodiments. Also, various data is stored in a data store 113 that is accessible to the computing environment 103. The data store 113 may be representative of a plurality of data stores 113 as can be appreciated. The data stored in the data store 113, for example, is associated with the operation of the various applications and/or functional entities described below.

The components executed on the computing environment 103, for example, include an electronic commerce system 116, and other applications, services, processes, systems, engines, or functionality not discussed in detail herein. The electronic commerce system 116 is executed in order to facilitate the online purchase of items over the network 109. The electronic commerce system 116 also performs various back-end functions associated with the online presence of a merchant in order to facilitate the online purchase of items as will be described. For example, the electronic commerce system 116 generates network pages such as web pages or other types of network content that are provided to clients 106 for the purposes of selecting items for purchase, rental, download, lease, or other form of consumption as will be described.

The electronic commerce system 116 generates item detail pages 123. The item detail pages 123 may comprise, for example, network pages such as web pages that are rendered as a user interface by a browser. Alternatively, an item detail page 123 may comprise information that expresses item details in a manner such that a user interface may be generated therefrom by a dedicated application other than a browser. The item detail page 123 may include detailed information regarding an item whose entire content may or may not be fully viewable on a display device for the user using the client device 106. The item detail page 123 may also include network links to network pages or other network content beyond the item detail page 123 itself. These network links may be, for example, a manufacturer's website, customer review page, or any other network links that provide relevant information about the featured item.

The electronic commerce system 116 includes a search application 133, a content modifying application 136, other applications, services, processes, systems, engines, or functionality not discussed in detail herein. According to one embodiment, the search application 133 is executed to search the content of the item detail page 123 as will be described. The content modifying application 136 is executed to develop a more effective presentation of the item information to users in later versions of the item detail page 123 or other pages based on searches in the item detail pages 123 by many users.

The data stored in the data store 113 includes, for example, network page data 143, item detail search history 146, a catalog 149, and potentially other data. The network page data 143 includes the data from which the electronic commerce system 116 may generate, for example, an item detail page 123 and/or other pages. The item detail search history 146 may include an accumulation of data regarding the searches performed within an item detail page 123 or an item detail page, including, for example, what strings were searched by what customer on what date and other information. The catalog 149 includes a listing of items 163 and may include information describing the items 163 sold through the electronic commerce system 116 and other relevant data. An item 163 may refer to a product, good, service, software download, multimedia download, or other item that may be offered for sale, purchase, rental, lease, download, and/or any other form of consumption as can be appreciated. The information regarding an item 163 may include significant detail information about the item, such as, for example, name, price, description, specification, manufacturer's information, user reviews, and so on.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client 106 may be configured to execute various client applications 173. The client application 173 may comprise a browser, or a dedicated application. The client application 173 may be executed in a client 106, for example, to access and render pages containing network content such as network pages (e.g., web pages), or other network content served up by a computing device and/or other servers. The client 106 may be configured to execute applications beyond a client application 173 such as, for example, email applications, instant message applications, and/or other applications.

The client 106 also includes a display 176. The display 176 may comprise, for example, one or more devices such as cathode ray tubes (CRTs), liquid crystal display (LCD) screens, gas plasma-based flat panel displays, LCD projectors, or other types of display devices, etc. The client application 173 may render an item detail page 123 on the display 176. In one embodiment, the item detail page 123 includes a search box 183 where a user may input a search string using a client device 106. The item detail page 123 may also depict a search result 186 once a search is performed on the item detail page 123. The user interface 179 may otherwise display the item detail page 123 along with a search box 183 and/or a search result 186.

Next, a general description of the operation of the various components of the networked environment 100 is provided. To begin, a user at the client 106 may interact with the electronic commerce system 116 through the network 109 to access the item detail page 123 and potentially other pages. Ultimately, the item detail page 123 is rendered on the display 176 of the client 106. It may be the case that the item detail page 123 may or may not be fully viewable to the user through the client 106. Specifically, it may be the case that the item detail page 123 includes a scrolling feature to facilitate viewing content that appears below-the-fold as can be appreciated. The item detail page 123 includes various content and potentially includes network links to other pages as well as other content.

The item detail page 123 also includes the search box 183. The search box 183 facilitates entry of a search string by a user. According to one embodiment, the search box 183 facilitates a local search of the content of the item detail page 123 itself. The user may enter a search string into the search box 183 in the user interface 179 and click on an appropriate button or other graphical component to implement a search of the content of the item detail page 123 based on the entered search string.

The search of the item detail page 123 may be performed on the client 106 itself. To this end, the item detail page 123 may include an executable that facilitates a search of its content in embodiments where the client application 173 comprises a browser. Alternatively, in the case that the client application 173 comprises a dedicated application, the search functionality may be included in the client application 173 itself. In either situation, the search of the item detail page 123 is performed on the client 106 and results are rendered for the user accordingly.

In an alternative embodiment, the search of the item detail page 123 may be performed by the search application 133 in the computing environment 103. In this embodiment, the client application 173 may be configured to transmit the search string to the search application 133 to perform the search. The search application 133 may obtain a local copy of the item detail page 123 and then may perform a search thereof in the computing environment 103. In this example, the results of the search are then sent from the search application 133 back to the client 106 to be rendered on the display 176 for the user.

Upon completion of the search, various approaches may be used to present the results of the search to the user within the item detail page 123. For example, in one embodiment the client application 173 may highlight each instance of the search terms in the item detail page 123 that comprises the rendered item detail page 123. Such highlighting may comprise changing the color of text or images, changing the background color around text or images, causing text or images to blink or alter their appearance in some other manner. Also, the client application 173 may be caused to automatically scroll the item detail page 123 to a position in which the search terms are presented in the middle or other portion of the display 176. Such search terms may be highlighted as well as described above.

In another embodiment, the client application 173 may render a separate box or window to depict the search result 186. Such separate box or window may be in the form of a light box at the center with grayed background, a peaking window on a corner or an edge of a browser, a floating window, or any other embodiment that displays the search result 186 separate from the content of the item detail page 123.

After a given search of an item detail page 123 is performed, the search data regarding the search may be stored in an item detail search history 146. As users browse the item detail page 123 and search certain search strings, an item detail search history 146 will accumulate the search data for each item detail page 123 as a corresponding item detail search history 146 in the data store 113 of the computing environment 103. For each search performed, the search data may include whether and where the elements of a search string were found in the content of the item detail page 123. Also, given that multiple users may perform the same search, the item detail search history 146 will indicate how often a search was performed based on a given search string by the multiple users.

The content modifying application 136 may determine whether the item detail page 123 should be modified to present the item detail page 123 to the users more effectively based on the item detail search history 146. If, for example, many users search for information presented near the end of an item detail page 123, the content modifying application 136 may then determine that it would be more effective to move such information to a more prominent position in the item detail page 123. Then, the users can readily view the information without scrolling up/down and manually searching for such information in the item detail page 123.

Furthermore, the content modifying application 136 may determine that certain information regarding a particular item is sought by multiple users and is one of the major considerations when buying the item. In such case, that information may be included in a listing of items 163 in the catalog 149 so that the information, for example, may be included in network contents or pages beyond the item detail page 123. Also, for example, many users may look for particular information when shopping for items in a certain category. In such case, the content modifying application 136 may identify the features that the users generally seek in buying such items. The content modifying application 136 then may provide recommendations to the item sellers as to what information should be included in the item detail pages 123 that feature the sellers' items.

Figure 2:
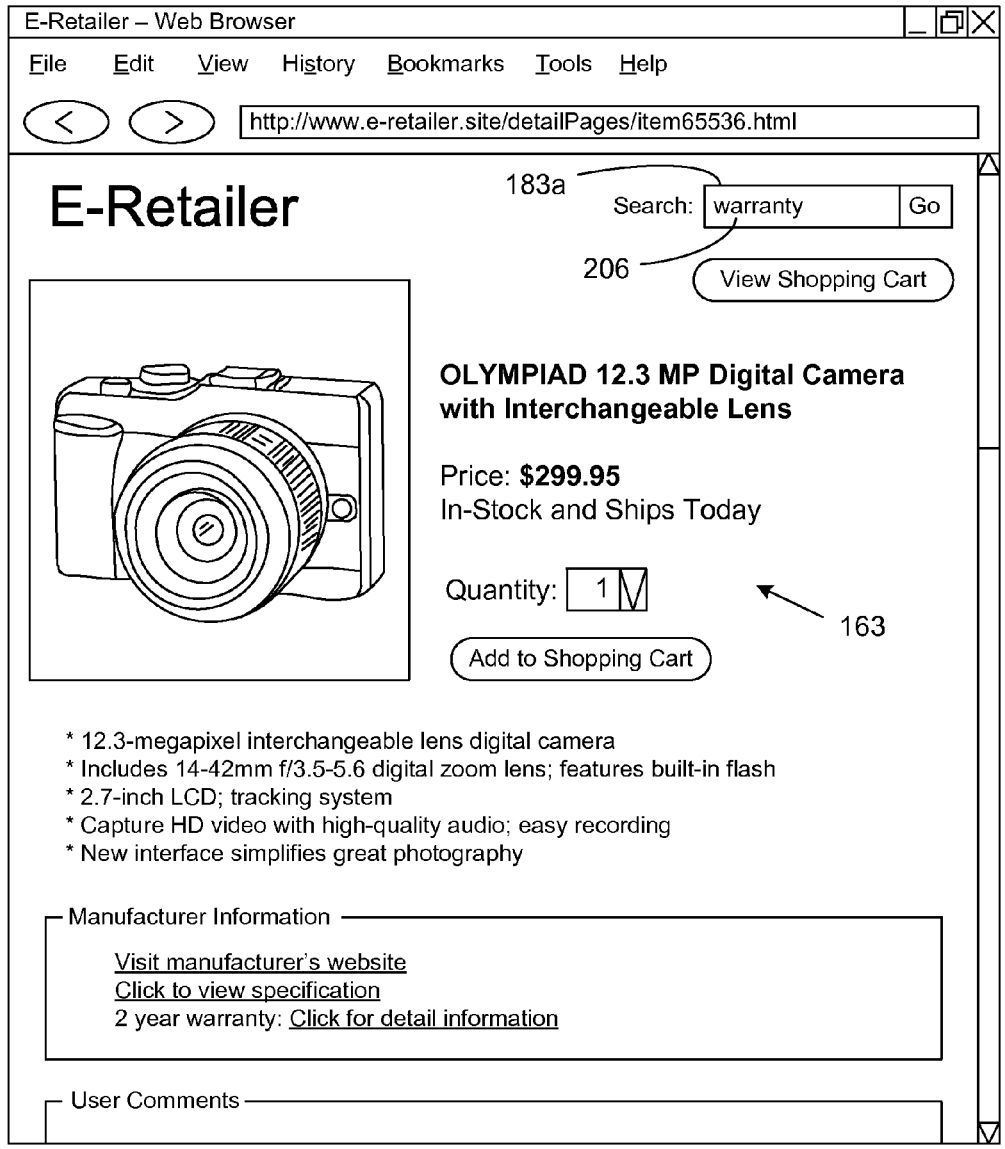
FIG. 2 is a drawing of an example of an item detail page rendered by a client in the networked environment of FIG. 1 according to various embodiments of the present disclosure.

Referring next to FIG. 2, shown is one example of an item detail page 123, denoted herein as item detail page 123a, rendered by a client application 173 (FIG. 1) executed in a client 106 (FIG. 1) in the networked environment 100 (FIG. 1). The item detail page 123a includes detailed information about an item 163 including an image of the item 163, title, features, and other information. In addition, the item detail page 123 includes an example of a search box 183a in which a user has entered a search string 206. When a user visits the item detail page 123a, the user can enter the search string 206 therein to implement a search within the item detail page 123. The sample item detail page 123a depicted in the example of FIG. 2 features an image of a camera with various specifications and information describing the camera. In this example shown, the user has entered a search string 206 to search for "warranty" information in the content of the item detail page 123a itself.

Figure 3A:
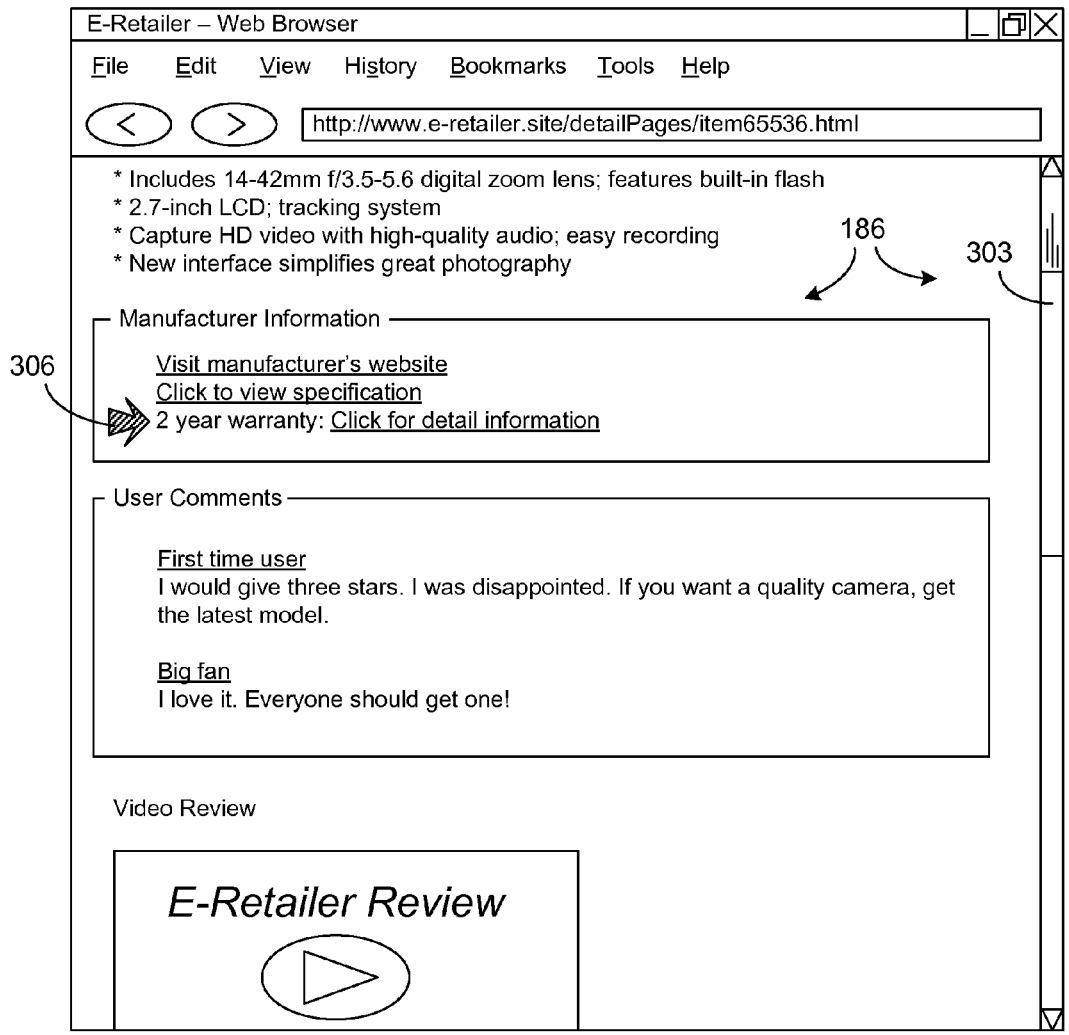
FIGS. 3A and 3B are drawings of further examples of item detail pages rendered by a client in the networked environment of FIG. 1 according to various embodiments of the present disclosure.

Turning now to FIG. 3A, shown is another example of an item detail page 123, denoted herein as item detail page 123b, rendered by a client application 173 (FIG. 1) executed in a client 106 (FIG. 1) in the networked environment 100 (FIG. 1). The item detail page 123b depicts a search result 186 by virtue of a scrolling action with a scroll bar 303 and a pointing action with an arrow 306 to facilitate viewing of the search result 186. The scroll bar 303 has been automatically scrolled to display the information that corresponds to the search string input in the search box 203 (FIG. 2). An arrow 306 is displayed to direct the user's attention to a portion of item detail page 123b. The search was performed based on the search string 206 (FIG. 2) "warranty" in this example item detail page 123b, and the arrow 306 is pointing to the warranty information that is found in the item detail page 123b. Although the implemented actions to direct the user's attention to a portion of the content in this user interface 179b are scrolling and pointing actions, other actions may be implemented to draw user attention to the search result 186 according to various embodiments. Such embodiments may include, but are not limited to scrolling, pointing, highlighting, circling, underlining, modifying fonts and/or size, modifying colors, implementing animations, or other actions.

Figure 3B:
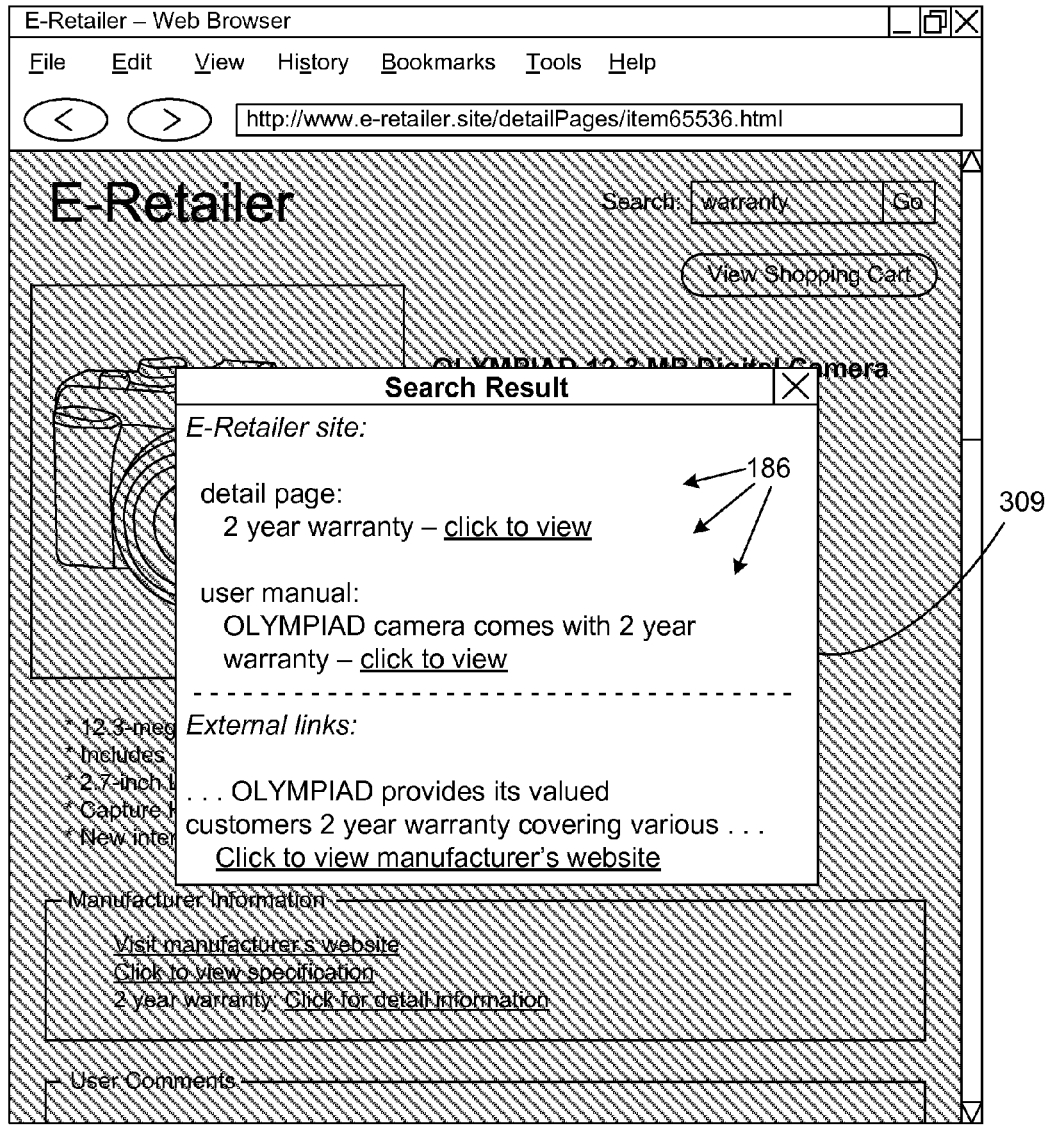

Moving on to FIG. 3B, shown is another example of an item detail page 123, denoted herein as item detail page 123c, rendered by a client application 173 (FIG. 1) executed in a client 106 (FIG. 1) in the networked environment 100 (FIG. 1). As shown, a separate light box 309 is imposed on top of the item detail page 123c that displays the item detail content. The light box 309 depicts search result 186 separate from the item detail page 123c. The light box 309 in this example shows "2 year warranty" found in the item detail page 123c. The light box 309 also shows additional warranty information that is not specifically located in the item detail page 123c but can be found within the E-Retailer site. Additionally, the light box 309 shows information found external to the item detail page 123c in the manufacturer's website, which is an example of content that may be accessed through network links in the item detail page 123c. Although this example of an item detail page 123c also depicts a light box 309 in the center where the background is grayed out, the search result 186 may be embodied as part of the item detail page 123c in some other manner. Such embodiments may include, but are not limited to a floating window with or without a background change, a peaking window on one or more of the corners or edges of the browser, or a new tab or new window displaying the search result 186.

Figure 4:
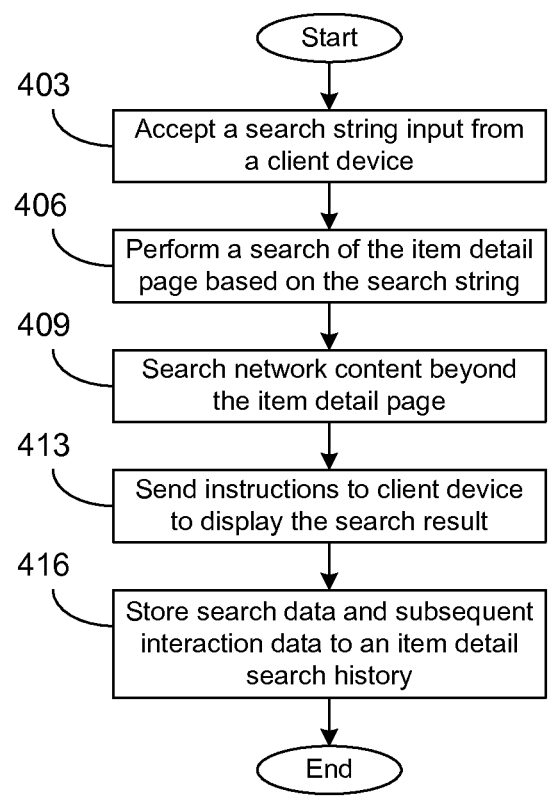
FIGS. 4 and 5 are flowcharts illustrating examples of functionality implemented as portions of search application executed in a computing environment in the networked environment of FIG. 1 according to various embodiments of the present disclosure.

With reference to FIG. 4, shown is a flowchart that provides one example of the operation of a portion of the search application 133 according to various embodiments. It is understood that the flowchart of FIG. 4 provides merely an example of the many different types of functional arrangements that may be employed to implement the operation of the portion of the search application 133 as described herein. As an alternative, the flowchart of FIG. 4 may be viewed as depicting an example of steps of a method implemented in the computing environment 103 (FIG. 1) according to one or more embodiments.

The flowchart of FIG. 4 shows an example of how the search application 133 may search an item detail page 123 (FIG. 1) and perform other related functions. In this respect, the flowchart of FIG. 4 depicts a server side implementation of a search as will be described.

Beginning with box 403, the search application 133 accepts a search string input from a client device 106 (FIG. 1) through the network 109 (FIG. 1). The search string input is facilitated by the search capability provided by the search box 183 (FIG. 1), which in turn is facilitated by the item detail page 123 that is generated by the electronic commerce system 116 (FIG. 1) of the computing environment 103. After accepting a search string input, the search application 133 proceeds to box 406 and performs a search of the item detail page 123. This search is performed on a local copy of the page that may be generated in the same way the item detail page 123 was first encoded to send to its client device 106 or any other generated or retained form of a local copy of the content of the item detail page 123. The search application 133 may search the entirety of the item detail page 123 including the below-the-fold content (content not immediately viewable to the user on display without scrolling) and content referenced by network links included in the item detail page 123. Proceeding to box 409, the search application 133 may perform a subsequent search of network content beyond the item detail page 123 including network content linked or not linked to the item detail page 123. If any portion of the search is performed by the client device 106, then the search application 133 would receive the data regarding the search and the search result through the network 109.

Once the search of the item detail page 123 is performed, the search application 133 proceeds to box 413 and sends instructions to the client device 106 to display the search result 186 (FIG. 1) to the client device 106 through the network 109. The instructions may include, but are not limited to, implementations of an action to direct attention to a portion of the item detail page 123 responsive to the search string 206 (FIG. 2) or a display of the search result 186 separate from the display of the item detail page 123. In box 416, the search application 133 stores search data describing the search performed and subsequent user interaction data to an item detail search history 146. The search data may include, but is not limited to, when, by what user, and for what search string 206 was the search performed, and whether and where the string was found. The subsequent user interaction data may include, but is not limited to, whether the user selected any link provided as the search result 186, whether the user proceeded to purchase the item featured in the item detail page 123, or any other data that reflects the user's response to the display of the search result 186 after the search. Thereafter, the portion of the search application 133 ends.

Figure 5:
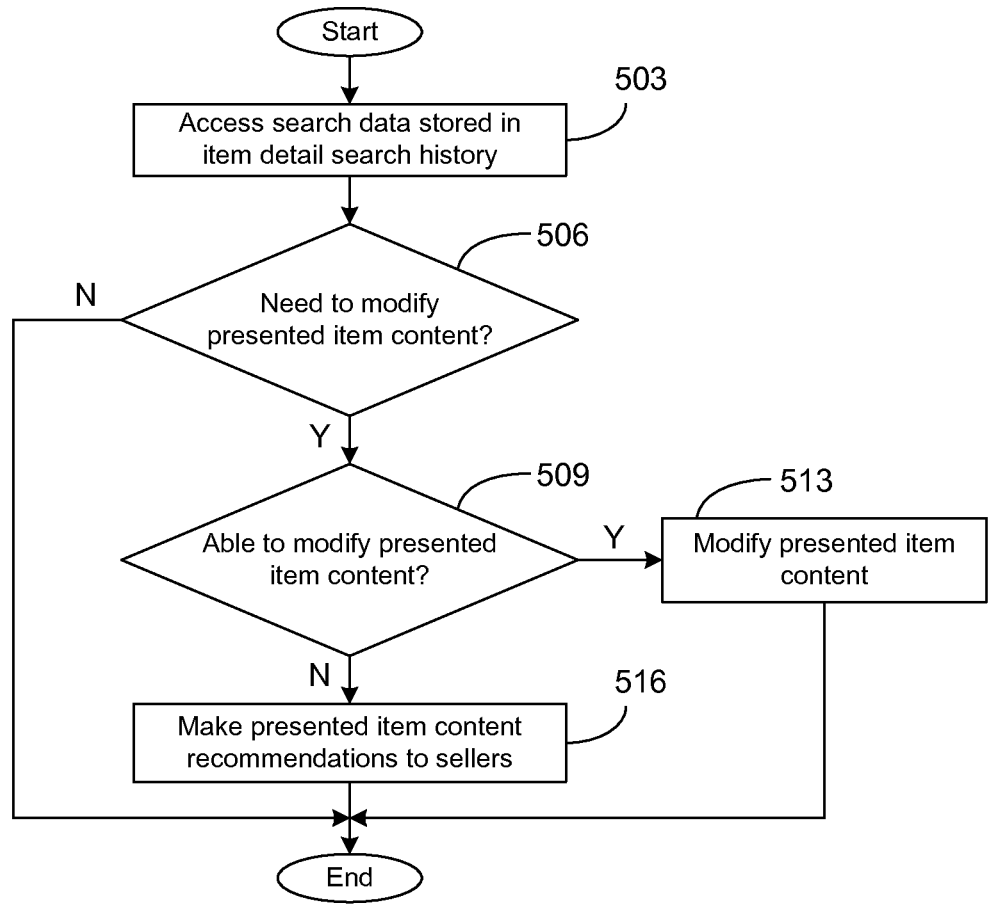

Referring next to FIG. 5, shown is a flowchart that provides one example of the operation of a portion of the content modifying application 136 according to various embodiments. It is understood that the flowchart of FIG. 5 provides merely an example of the many different types of functional arrangements that may be employed to implement the operation of the portion of the content modifying application 136 as described herein. As an alternative, the flowchart of FIG. 5 may be viewed as depicting an example of steps of a method implemented in the computing environment 103 (FIG. 1) according to one or more embodiments.

The flowchart of FIG. 5 shows an example of how the content modifying application 136 may modify an item detail page 123 (FIG. 1) and/or other related data in response to searches performed on such item detail page 123 over time.

Beginning with box 503, the content modifying application 136 accesses the search data stored in one or more item detail search histories 146 (FIG. 1). Proceeding to box 506, the content modifying application 136 determines if the item detail page 123 of a particular item should be modified based on multiple searches performed on the item detail page 123. To this end, the content modifying application 136 may implement an algorithm that determines whether the item detail page 123 should be modified according to an item detail search history 146. For example, such an algorithm may determine that the presentation of the content of an item detail page 123 should be changed because the number of searches of a particular term has exceeded a set threshold. The content modifying application 136 may also otherwise determine whether the presented item content should be modified in the item detail page 123 based on the item detail search history 146.

The content modifying application 136 may also determine whether content of a listing of the item 163 (FIG. 1) in a catalog 149 (FIG. 1) should be modified based on the item detail search history 146. For example, according to the search data stored in the item detail search history 146, the content modifying application 136 may determine that certain information should be added to or removed from the listing of the item 163 in the catalog 149.

Also, the content modifying application 136 may change the presentation priority of certain presented item content. For example, the item content may be presented on a search result network page featuring multiple items, a user interface including a short description of the item, or any other presentation of the item content in a form other than the item detail page 123 itself. As another example, a user may visit a network page featuring multiple items in a category. Such network page may include the name and a short description of each item. The short description of an item in this network page may not include certain information presented in the item detail page 123. Based on the item detail search history, the content modifying application 136, for example, may determine certain information that is only presented in the item detail page should be presented in the short item description on this network page.

If the content modifying application 136 determines that the item detail page 123 should be modified, the content modifying application 136 proceeds to box 509. Otherwise, the content modifying application 136 ends as shown.

In box 509, the content modifying application 136 then determines whether the application can modify the presented item content without third party permission. If the content modifying application 136 can modify the presented item content without third party permission, the application proceeds to box 513 to modify the content accordingly. Otherwise, the content modifying application 136 moves to box 516.

Assuming the content modifying application 136 proceeds to box 513, then based on the determinations made in box 506, the content modifying application 136 may modify presented item content of the item detail page, a network page featuring multiple items, a user interface featuring one or more items, or any other presented item content. The content modifying application 136 may modify the presentation in various ways, such as changing the order of the content display, changing the location of the display of the content of the item detail page 123, changing the appearance of the content, or applying any other modifications as determined by the content modifying application 136.

If the content modifying application 136 determines in box 509 that the content of the listing of the item 163 cannot be modified without third party permission, the content modifying application 136 proceeds to box 516 and generates a recommendation regarding the presented item content that is provided to the item seller. Based on the item detail search history 146, the content modifying application, for example, may recommend the seller to add, remove, reorganize, or otherwise modify the content of the seller's item detail page 123. Also, for example, if multiple users frequently search for particular information in a category of items 163, the item detail search histories 146 may store those multiple searches. The content modifying application 136 then may determine that such information is recommended for the sellers to include in their item detail page 123. Furthermore, based on the item detail search histories 146 of multiple items 163, the content modifying application 136 may make a recommendation to a seller who is creating a new item detail page 123.

A recommendation to a seller may be generated and delivered to the seller in various ways. For example, a recommendation may be given to a seller through a notification on a network page accessed by the seller, e-mail to the seller, text or automated phone message to the seller, or any other method of communication to the seller. Thereafter, the portion of the content modifying application 136 ends.

Figure 6:
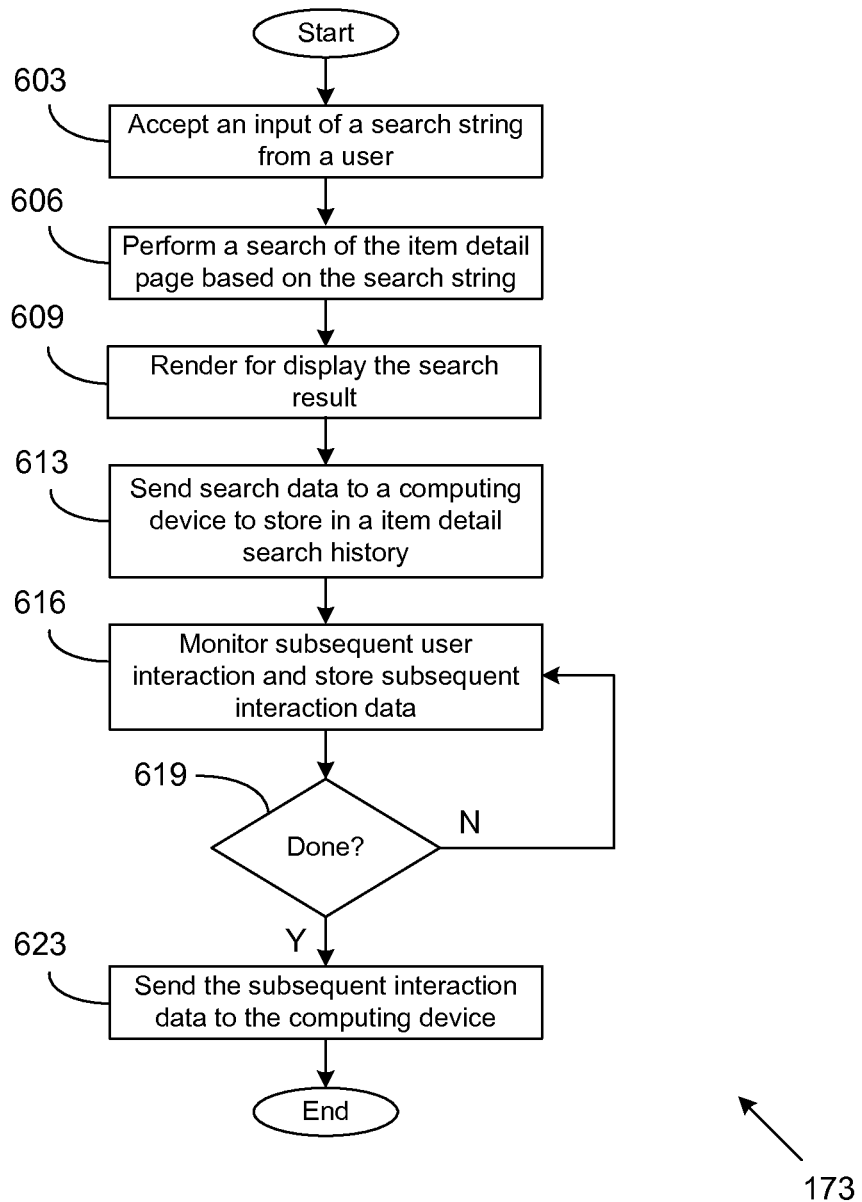
FIG. 6 is a flowchart illustrating one example of functionality implemented as portions of client application executed in a client device in the networked environment of FIG. 1 according to various embodiments of the present disclosure.

Turning now to FIG. 6, shown is a flowchart that provides one example of the operation of a portion of the client application 173 according to various embodiments. It is understood that the flowchart of FIG. 6 provides merely an example of the many different types of functional arrangements that may be employed to implement the operation of the portion of the client application 173 as described herein. As an alternative, the flowchart of FIG. 6 may be viewed as depicting an example of steps of a method implemented in the computing environment 103 (FIG. 1) according to one or more embodiments.

The flowchart of FIG. 6 shows an example of how the client application 173 may search an item detail page 123 (FIG. 1) and perform other related functions.

Beginning with box 603, the client application 173 accepts an input of a search string from a user where the input is facilitated by the search box 183 (FIG. 1) of the item detail page 123. After accepting the search string input, the client application 173 proceeds to box 606 and performs a search of the item detail page 123. The client application 173 then proceeds to box 609 and renders for display the search result 186 using any one of the approaches described above. A portion of the search may be performed in the computing environment 103. In that case, the client application 173 may send the search string input to the computing environment 103 and receive instructions to display the search result 186 on the display 176 through the network 109. Then, proceeding to box 613, the client application 173 sends the search data to the electronic commerce system 116 so that such information may be stored in the item detail search history 146 (FIG. 1).

The client application 173 then proceeds to box 616 and monitors subsequent user interaction and stores the subsequent interaction data after the display of the search result 186 to the user. Subsequent interaction may comprise browsing behavior, purchases made, placing items in a wishlist, or other user interaction. Proceeding to box 619, the client application 173 may determine whether the monitoring of subsequent user interaction should be terminated. The client application 173 may determine that the monitoring should be terminated, for example, after a predefined time period, after a single session or a predefined number of sessions are finished, or based on other factors. Once the client application 173 terminates monitoring the user interaction, it proceeds to box 623 and sends the subsequent interaction data to the computing environment 103 through the network 109. Thereafter, the portion of the client application 173 ends.

Figure 7:
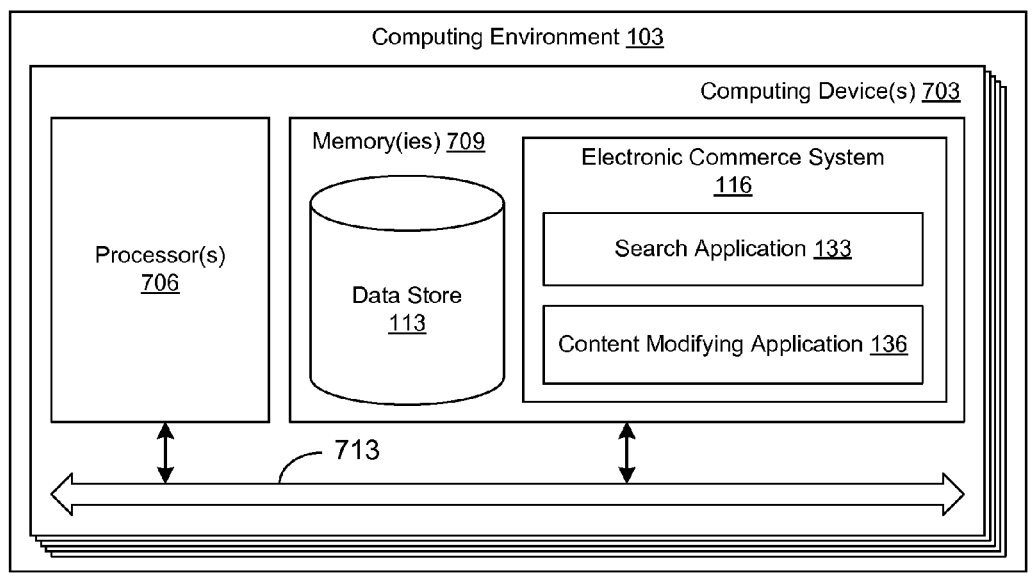
FIG. 7 is a schematic block diagram that provides one example illustration of a computing environment employed in the networked environment of FIG. 1 in a computing environment according to various embodiments of the present disclosure.

With reference to FIG. 7, shown is a schematic block diagram of the computing environment 103 according to an embodiment of the present disclosure. The computing environment 103 includes one or more computing devices 703. Each computing device 703 includes at least one processor circuit, for example, having a processor 706 and a memory 709, both of which are coupled to a local interface 713. To this end, the computing device 700 may comprise, for example, at least one server computer or like device. The local interface 713 may comprise, for example, a data bus with an accompanying address/control bus or other bus structure as can be appreciated.

Stored in the memory 709 are both data and several components that are executable by the processor 706. In particular, stored in the memory 709 and executable by the processor 706 are the electronic commerce system 116, which includes the search application 133, the content modifying application 136, and potentially other applications. Also stored in the memory 709 may be a data store 113 and other data. In addition, an operating system may be stored in the memory 709 and executable by the processor 706.

Figure 8:
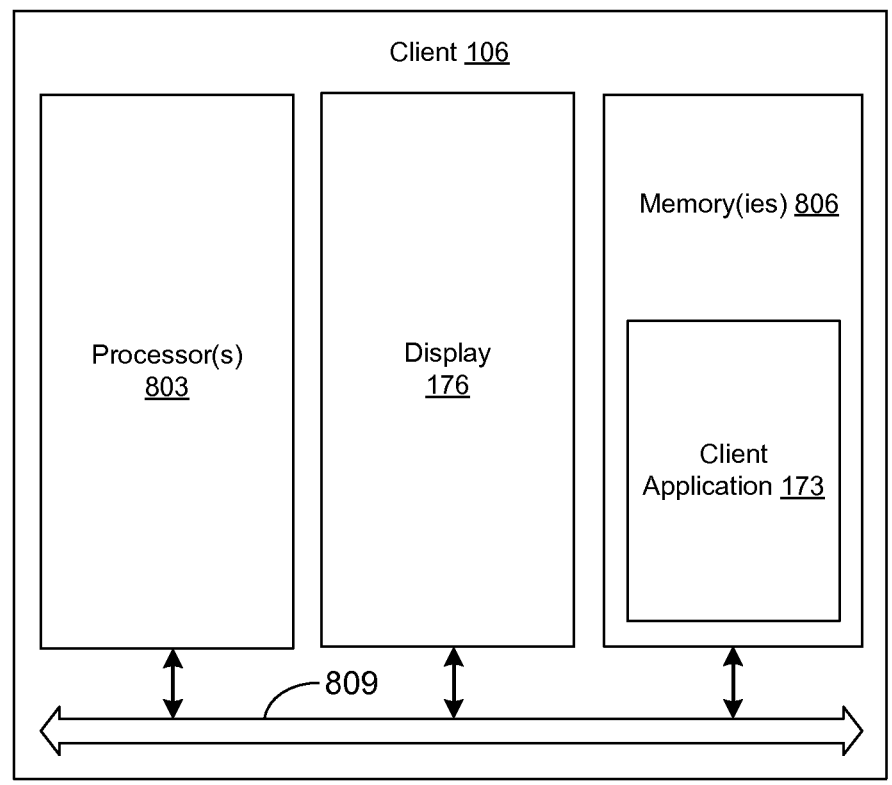
FIG. 8 is a schematic block diagram that provides one example illustration of a client device employed in the networked environment of FIG. 1 according to various embodiments of the present disclosure.

With reference to FIG. 8, shown is a schematic block diagram of the client computing device 106 according to an embodiment of the present disclosure. The client computing device 106 includes at least one processor circuit, for example, having a processor 803 and a memory 806, both of which are coupled to a local interface 809. To this end, the client computing device 106 may comprise, for example, at least one computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the client application 173, and potentially other applications. In addition, an operating system may be stored in the memory 806 and executable by the processor 803.

With reference to both FIGS. 7 and 8, it is understood that there may be other applications that are stored in the memories 709 and 806 and are executable by the processors 706 and 803 respectively as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memories 709 and 806 and are executable by the processors 706 and 803 respectively. In this respect, the term "executable" means a program file that is in a form that can ultimately be run by the processors 706 and 803. Examples of executable programs may be, for example, a compiled program that can be translated into machine code in a format that can be loaded into a random access portion of the memories 709 and 806 and run by the processors 706 and 803 respectively, source code that may be expressed in proper format such as object code that is capable of being loaded into a random access portion of the memories 709 and 806 and executed by the processors 706 and 803 respectively, or source code that may be interpreted by another executable program to generate instructions in a random access portion of the memories 709 and 806 to be respectively executed by the processors 706 and 803, etc. An executable program may be stored in any portion or component of the memories 709 and 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 709 and 806 are defined herein as including both volatile and nonvolatile memory and data storage components. Volatile components are those that do not retain data values upon loss of power. Nonvolatile components are those that retain data upon a loss of power. Thus, the memories 709 and 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 706 and 803 may represent multiple processors 706 and 803 and the memories 709 and 806 may represent multiple memories 709 and 806 that operate in parallel processing circuits, respectively. In such a case, the respective local interfaces 713 and 809 may be an appropriate network that facilitates communication between any two of the multiple respective processors 706 and 803, between any respective processors 706 and 803 and any of the respective memories 709 and 806, or between any two of the respective memories 709 and 806, etc. The local interfaces 713 and 809 may comprise additional systems designed to coordinate this communication, including, for example, performing load balancing. The processors 706 and 803 may be of electrical or of some other available construction.

Although the electronic commerce system 116, which includes the search application 133 and the content modifying application 136, the client application 173, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4, 5, and 6 show the functionality and operation of an implementation of portions of the search application 133, the content modifying application 136, and the client application 173. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processors 706 and 803 in a computer system or other system. The machine code may be converted from the source code, etc. If embodied in hardware, each block may represent a circuit or a number of interconnected circuits to implement the specified logical function(s).

Although the flowcharts of FIGS. 4, 5, and 6 show a specific order of execution, it is understood that the order of execution may differ from that which is depicted. For example, the order of execution of two or more blocks may be scrambled relative to the order shown. Also, two or more blocks shown in succession in FIGS. 4, 5, and 6 may be executed concurrently or with partial concurrence. Further, in some embodiments, one or more of the blocks shown in FIGS. 4, 5, and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 116, which includes the search application 133 and the content modifying application 136, and the client application, that comprises software or code can be embodied in any non-transitory computer-readable medium for use by or in connection with an instruction execution system such as, for example, processors 706 and 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program that, when executed in at least one computing device, causes the at least one computing device to at least:

encode for display a representation of an item in an item detail page that includes a search capability to search item detail page content associated with the item of the item detail page, wherein the item detail page content includes a link to further network content;

perform, by the at least one computing device, a search of the item detail page content in response to a search string input from a client device where an entry of the search string input is facilitated by the item detail page;

in response to the search producing a search result, send, by the at least one computing device, at least one instruction to display the search result of the search to the client device, wherein the instruction causes at least one of:

an action to direct attention to a portion of the item detail page content responsive to the search result; or a display of the search result separate from the item detail page content;

in response to the search failing to produce the search result, perform, by the at least one computing device, a subsequent search of the further network content accessed by the at least one computing device via the link using the search string;

store search data associated with at least one of the search or the subsequent search to an item detail search history associated with the item detail page; and store data received from the client device, the data indicating an interaction between a user and a network site after at least one of the search or the subsequent search.

2. The computer-readable medium of claim 1, wherein when executed the program further causes the at least one computing device to at least:

modify the item detail page by repositioning the item detail page content based at least in part on the item detail search history; and modify an item listing content associated with the item detail page based at least in part upon a predefined threshold number of searches for a designated content indicated in the item detail search history.

3. The computer-readable medium of claim 1, wherein when executed the program further causes the at least one computing device to at least comprising code that provides provide a seller client device an item detail page content recommendation based at least in part on a plurality of item detail search histories.

4. The non-transitory computer-readable medium of claim 1, wherein the portion of the item detail page content is below-the-fold content.

5. The non-transitory computer-readable medium of claim 1, wherein the action to direct attention includes a scrolling action.

6. The non-transitory computer-readable medium of claim 1, wherein when executed the program further causes the at least one computing device to at least send a request for interaction data between the client device and the network site after the search or the subsequent search.

7. A system, comprising at least one computing device;

a program executable in the at least one computing device, wherein when executed the program causes the at least one computing device to at least:

encode for display a representation of an item in an item detail page that includes a search capability to search item detail page content associated with the item of the item detail page, wherein the item detail page content includes a link to further network content;

perform, by the at least one computing device, a search of the item detail page content in response to a search string input from a client device where an entry of the search string input is facilitated by the item detail page;

in response to the search producing a search result, send, by the at least one computing device, at least one instruction to display the search result of the search to the client device, wherein the instruction causes at least one of:

an action to direct attention to a portion of the item detail page content responsive to the search result; or a display of the search result separate from the item detail page content;

in response to the search failing to produce the search result, perform, by the at least one computing device, a subsequent search of the further network content accessed by the at least one computing device via the link using the search string;

store search data associated with at least one of the search or the subsequent search to an item detail search history associated with the item detail page; and store data received from the client device, the data indicating an interaction between a user and a network site after at least one of the search or the subsequent search.

8. The system of claim 7, wherein when executed the program further causes the at least one computing device to at least:

modify the item detail page by repositioning the item detail page content based at least in part on the item detail search history; and modify an item listing content associated with the item detail page based at least in part upon a predefined threshold number of searches for a designated content indicated in the item detail search history.

9. The system of claim 7, wherein when executed the program further causes the at least one computing device to at least provide a seller client device an item detail page content recommendation based at least in part on a plurality of item detail search histories.

10. The system of claim 7, wherein the portion of the item detail page content is below-the-fold content.

11. The system of claim 7, wherein the action to direct attention includes a scrolling action.

12. The system of claim 7, wherein the action to direct attention includes a pointing action.

13. The system of claim 7, wherein when executed the program further causes the at least one computing device to at least send a request for interaction data between the client device and the network site after the search or the subsequent search.

14. A method, comprising encoding for display, by at least one computing device, a representation of an item in an item detail page that includes a search capability to search item detail page content associated with the item of the item detail page, wherein the item detail page content includes a link to further network content;

performing, by at least one computing device, a search of the item detail page content in response to a search string input from a client device where an entry of the search string input is facilitated by the item detail page;

in response to the search producing a search result, send, by the at least one computing device, at least one instruction to display the search result of the search to the client device, wherein the instruction causes at least one of:

an action to direct attention to a portion of the item detail page content responsive to the search result; or a display of the search result separate from the item detail page content;

in response to the search failing to produce the search result, perform, by the at least one computing device, a subsequent search of the further network content accessed by the at least one computing device via the link using the search string;

storing, by the at least one computing device, search data associated with at least one of the search or the subsequent search to an item detail search history associated with the item detail page; and storing, by the at least one computing device, data received from the client device, the data indicating an interaction between a user and a network site after at least one of the search or the subsequent search.

15. The method of claim 14, further comprising:

modifying, by the at least one computing device, the item detail page by repositioning the item detail page content based at least in part on the item detail search history; and modifying, by the at least one computing device, an item listing content associated with the item detail page based at least in part upon a predefined threshold number of searches for a designated content indicated in the item detail search history.

16. The method of claim 14, further comprising providing, by the at least one computing device, a seller client device an item detail page content recommendation based at least in part on a plurality of item detail search histories.

17. The method of claim 14, wherein the portion of the item detail page content is below-the-fold content.

18. The method of claim 14, wherein the action to direct attention includes a scrolling action.

19. The method of claim 14, wherein the action to direct attention includes a pointing action.

20. The method of claim 14, further comprising sending, by the at least one computing device, a request for interaction data between the client device and the network site after the search or the subsequent search.

* * * * *

UNITED STATES PATENT AND TRADEMARK OFFICE
CERTIFICATE OF CORRECTION

PATENT NO. : 9,235,858 B1
APPLICATION NO. : 13/557886
DATED : January 12, 2016
INVENTOR(S) : Sachin B. Singh and Martin C. Etreim Page 1 of 1

It is certified that error appears in the above-identified patent and that said Letters Patent is hereby corrected as shown below:

In the claims

Column 13, line 45: remove "comprising code that provides"

Signed and Sealed this
Ninth Day of August, 2016

Michelle K. Lee
*Director of the United States Patent and Trademark Office*